(12) United States Patent
Paulsen et al.

(10) Patent No.: US 7,366,957 B2
(45) Date of Patent: Apr. 29, 2008

(54) METHOD AND APPARATUS FOR CONTROLLING SAS/FIBRE TARGET BEHAVIOR FROM A HOST

(75) Inventors: Erik Paulsen, Colorado Springs, CO (US); Carl Gygi, Colorado Springs, CO (US); Mark Slutz, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 857 days.

(21) Appl. No.: 10/632,881

(22) Filed: Jul. 31, 2003

(65) Prior Publication Data

US 2005/0028044 A1    Feb. 3, 2005

(51) Int. Cl.
*G06F 11/00* (2006.01)
(52) U.S. Cl. ...................................... 714/43
(58) Field of Classification Search ............... 714/27, 714/32, 43; 710/15
See application file for complete search history.

(56) References Cited

U.S. PATENT DOCUMENTS

| | | | | |
|---|---|---|---|---|
| 5,796,938 A | * | 8/1998 | Emberty et al. | 714/27 |
| 6,061,753 A | * | 5/2000 | Ericson | 710/107 |
| 6,442,628 B1 | * | 8/2002 | Bastiani et al. | 710/60 |
| 6,477,587 B1 | * | 11/2002 | Isoda et al. | 710/6 |
| 6,539,503 B1 | * | 3/2003 | Walker | 714/703 |
| 6,601,119 B1 | * | 7/2003 | Slutz et al. | 710/104 |
| 7,027,948 B2 | * | 4/2006 | Mikami | 702/120 |
| 7,137,036 B2 | * | 11/2006 | Urahama | 714/36 |
| 2003/0196149 A1 | * | 10/2003 | Gygi et al. | 714/719 |
| 2004/0193747 A1 | * | 9/2004 | Zayas et al. | 710/15 |
| 2005/0268170 A1 | * | 12/2005 | Kearney et al. | 714/32 |

OTHER PUBLICATIONS

Microsoft Computer Dictionary, 4th Edition, Microsoft Press, 1999, p. 116.*

* cited by examiner

*Primary Examiner*—Christopher S McCarthy
(74) *Attorney, Agent, or Firm*—Suiter Swantz PC LLO

(57) ABSTRACT

The present invention is a method and system for providing a complete validation of an initiator and target within bus architecture. A target's behavior may be controlled by an initiator. Control of the target may be through execution of initiator commands including vendor unique commands relating to desired characteristics for testing. The initiator's response to the target's behavior may be verified due to the handshaking communication protocol between a target and initiator. Additionally, by altering the behavior of the target to test initiator response, a target's behavior is also validated.

14 Claims, 4 Drawing Sheets

METHOD AND APPARATUS FOR CONTROLLING SAS/FIBRE TARGET BEHAVIOR FROM A HOST

FIELD OF THE INVENTION

The present invention generally relates to a validation of initiator and target functionality in bus architecture, and more particularly to a method and system for controlling the behavior of a target by an initiator for the purpose of validating the functionality of an initiator and target.

BACKGROUND OF THE INVENTION

The capabilities of host computer environments have expanded significantly with the increased development of peripheral devices for attachment to the host computer. A variety of peripheral components are now available for use by the end user applications. For example, the peripheral environment may include external devices such as disk arrays, tapes, CD-ROMs, printers, network controllers, optical scanners, and various other apparatus that provide a wide range of functionality.

The external peripheral environment is typically connected to the host computer environment using suitable bus architecture. The Small Computer System Interface (SCSI) is one example of such a bus topology. Other types of bus topologies include Serial Attached SCSI (SAS) and Fibre Channel. In a typical arrangement of a bus topology, the host computer is configured with a host adapter provided in the form of a controller to provide the proper interfacing between the host bus, such as peripheral component interconnect (PCI), and the bus environment. The host computer will also include suitable device drivers for the installed peripheral devices.

The SCSI, SAS and Fibre Channel communication protocols employ a transaction process between a device configured as an initiator and a device configured as a target. Any device may be equipped with both functionalities. The initiator originates a request for an action or task to be performed, while a target receives and performs the requested task as expressed in a suitable command structure. For this purpose, the target typically includes a controller that enables it to perform the initiator-developed commands in a manner relatively independently of the initiator. A bus is used to transport data, command, and control information between the initiator and target.

In order to ensure correct operation of a bus protocol, a variety of tests are typically performed to determine proper initiator and target operation. For example, proper validation of an initiator may include the introduction of error conditions, corner cases of protocol, and non-standard data management. However, these behavioral characteristics are difficult to reproduce by using production or standard drives.

The use of a traffic generator, otherwise known in the art as a traffic jammer, has also been utilized to validate operation of initiators and targets. A traffic generator injects errors but does not have the capability of emulating varying target behaviors such as a data request size command for a particular input/output operation or controlling data transfer timing within a connection. Consequently, a method and apparatus for providing a complete validation of an initiator and target within bus architecture is necessary.

SUMMARY OF THE INVENTION

Accordingly, the present invention is directed to a method and system for providing a complete validation of an initiator and target within bus architecture. Validation may refer to the verification that the initiator and target operate as desired. In an embodiment of the invention, a target's behavior may be controlled by an initiator for the purpose of validating the proper initiator functionality. According to one embodiment of the invention, a target's behavior may be controlled by an initiator through use of vendor unique commands sent by the initiator. By leveraging the handshaking communication protocol between a target and initiator and the control of information transfer over a bus by the target, the method and system of the present invention may validate the operation of an initiator by its response to the target's behavior. Additionally, by altering the behavior of the target to test initiator response, a target's behavior is also validated.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
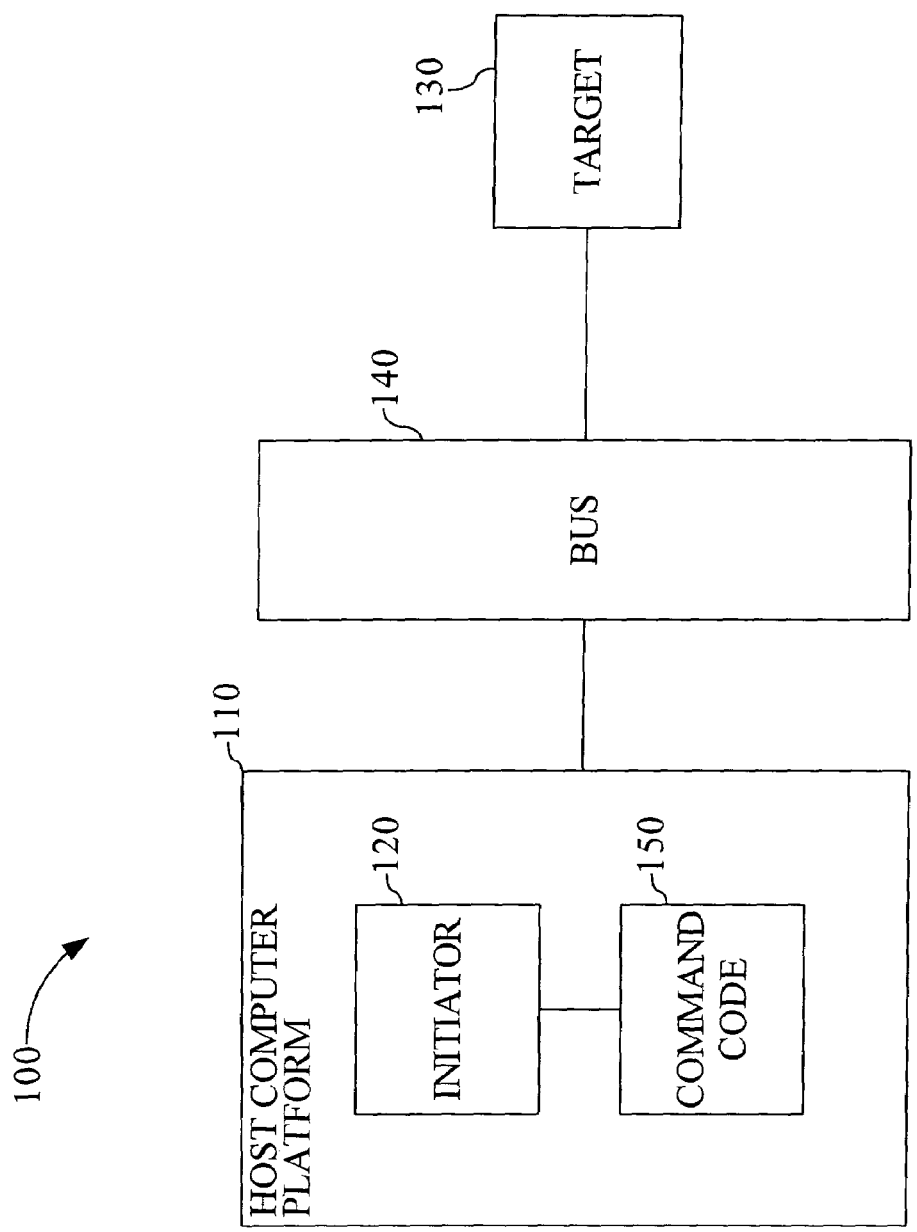
FIG. 1 depicts a block diagram of a bus architecture in accordance with an embodiment of the present invention.

Referring to FIG. 1, a block diagram of bus architecture 100 in accordance with an embodiment of the present invention is shown. A bus architecture 100 may include a host computer platform 110 having a resident device 120 preferably configured as an initiator. As known by those with ordinary skill in the art, an initiator 120 issues operation requests that are performed by a device 130 configured as a target. Operation requests are transferred through a bus 140. Bus 140 may operate according to various bus topologies including, but not limited to, SCSI, SAS and Fibre Channel.

Preferably, host computer platform 110 is provided with command code 150 associated with the initiator 120. Command code 150 may define behavioral modification processes for target 130. In one form, command code 150 may include vendor-specific or vendor-unique commands that are recognizable and thus executable by target 130. As known by those with ordinary skill in the art, SCSI command protocol for constructing the command module (i.e., Command Descriptor Block (CDB)) provides various fields for inserting vendor specific information. Other communication protocols such as SAS, Fibre Channel, and the like have similar ability to include vendor specific information within commands.

It is contemplated that various types of bus architecture exist and bus architecture 100 is provided for illustrative purposes only and should not be considered in limitation of the present invention. Rather, it should be apparent that the present invention may be practiced in connection with any bus architecture.

Figure 2:
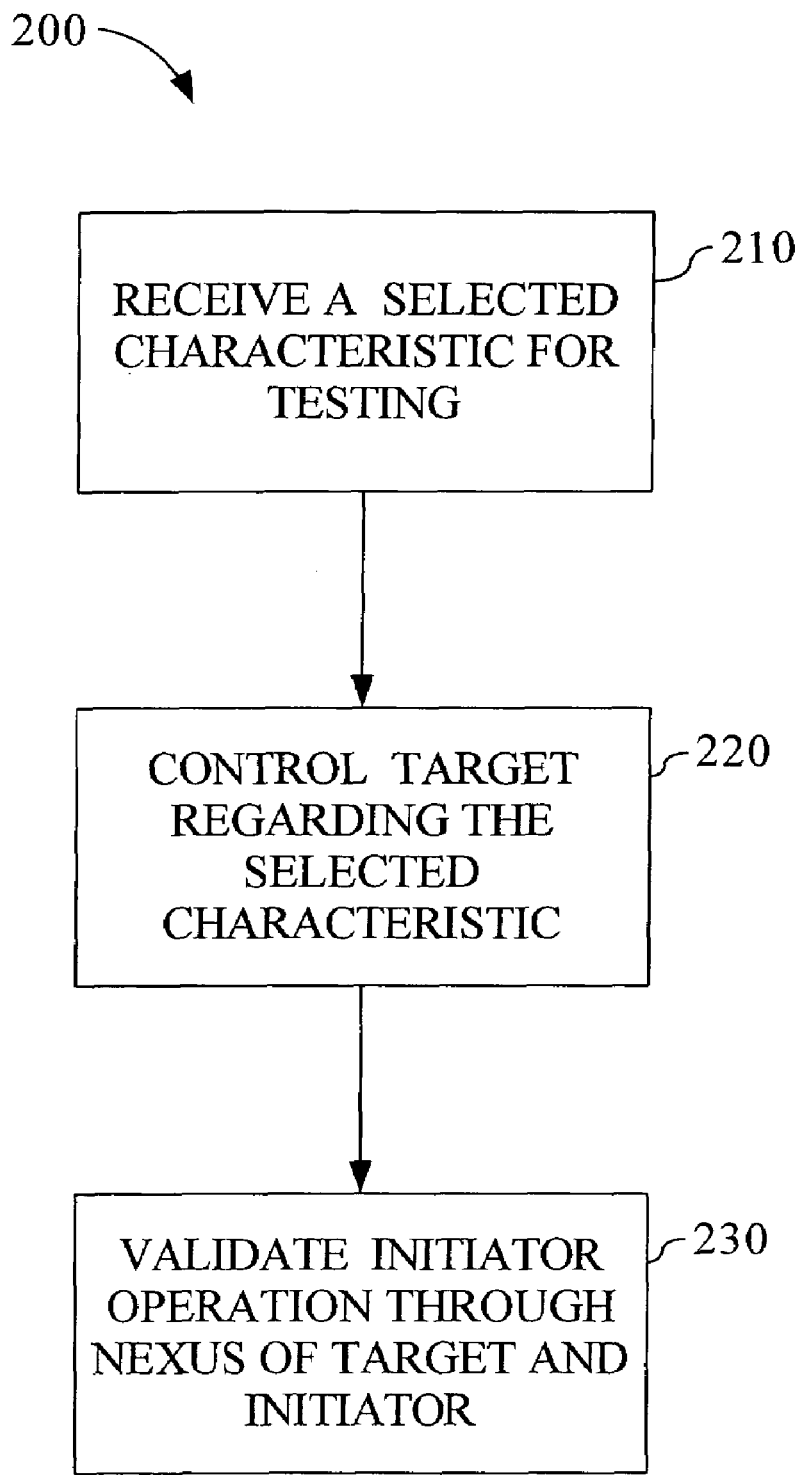
FIG. 2 depicts a process for validating initiator and target operation through control of target behavior.

Referring to FIG. 2, a process 200 for validating initiator and target operation through control of target behavior is shown. Process 200 may begin upon the receipt of a selection of a characteristic for testing 210. It is contemplated that a user may select a characteristic for testing through a user interface of host computer platform 110. Alternatively, receipt of a selection of a desired characteristic may be executed through the testing of each characteristic within a complete validation exercise whereby upon the completion of a first test, another characteristic is tested until each characteristic has been tested. Execution of the full domain test may be provided by compiling a list of all characteristics for testing whereby each characteristic is tested in an order to ensure complete validation of initiator operation.

Control of a target regarding the selected characteristic 220 may follow. For example, if the desired characteristic was error detection, an error, such as a CRC error may be injected and the target is controlled according to the CRC error. Through such operation, the initiator may be controlling the behavior of the target according to the selected characteristic for testing.

Initiator operation may be validated through the nexus of the target and initiator 230. The nexus of the target and initiator may refer to the embedded handshaking communication protocol between a target and initiator of an SCSI, SAS and Fibre Channel bus topology. Information transfer including command, data and status information may be controlled by a target. Information transfer is accomplished with the use of request (REQ) and acknowledge (ACK) signals sent between the initiator and target. Consequently, the initiator may respond to the target's operation. By verifying that the initiator has responded correctly, the initiator's operation may be validated. It is contemplated that the target's behavior may also be validated by its response to the initiator's response to the target's operation.

Figure 3:
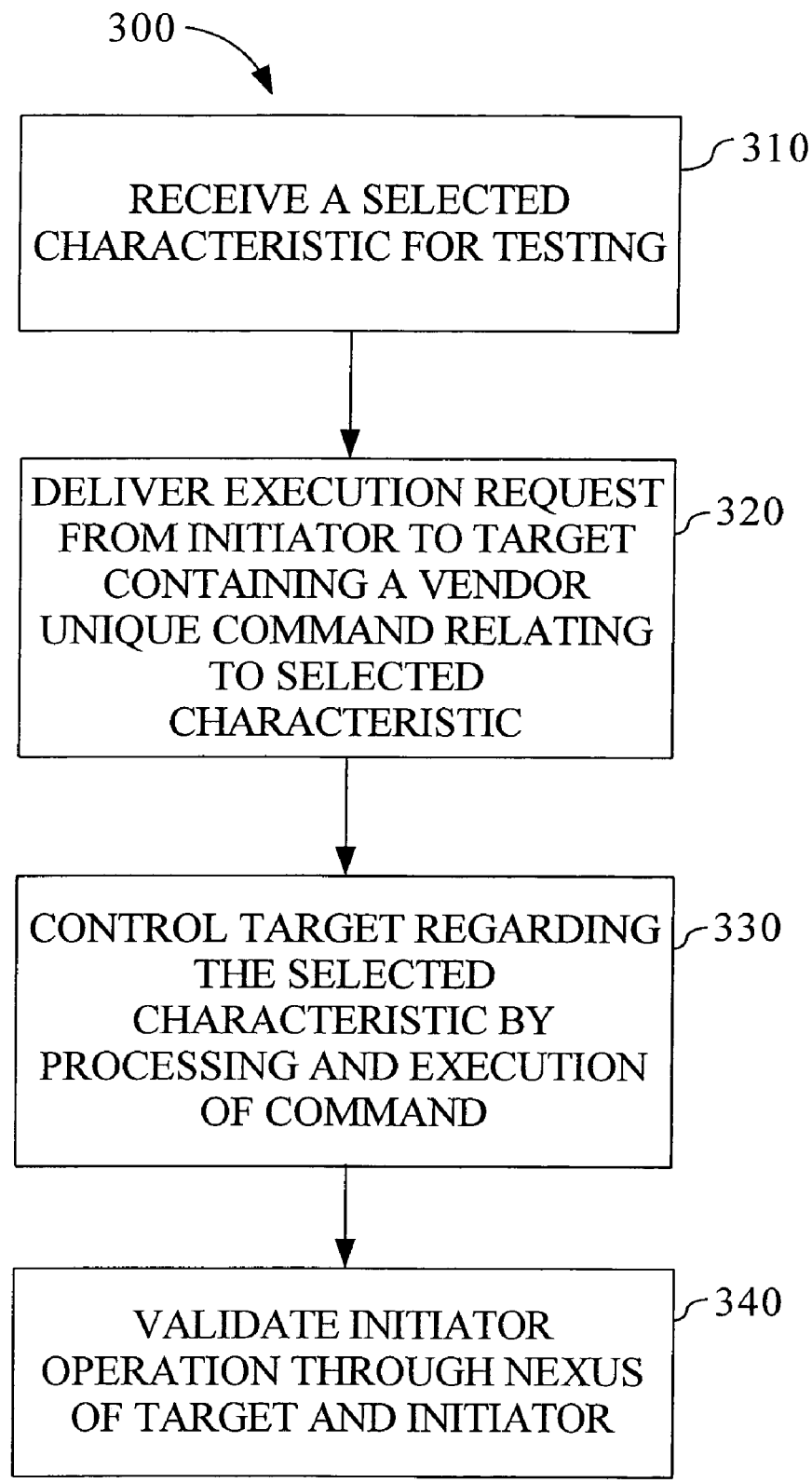
FIG. 3 depicts a process for executing the validation process of FIG. 2 employing vendor unique commands in accordance with an embodiment of the invention.

Referring to FIG. 3, a process 300 for executing the validation process of FIG. 2 employing vendor unique commands in accordance with an embodiment of the invention is shown. Process 300, similar to process 200 of FIG. 2, may begin upon the receipt of a selection of a characteristic for testing 310. An initiator-resident command execution request containing vendor unique commands recognizable by a target may be directed to the target 320. Vendor unique commands may relate specifically to the selected characteristic for testing, consequently, upon a selection of a desired characteristic for testing, a specific vendor unique command relating to the selected characteristic is embedded within a command from the initiator to the target.

Target behavior may be controlled by processing and executing the command execution request received from the initiator 330. The target may execute the command execution request including the vendor unique command relating to the selected characteristic. By execution of the request, the target is operating under the control of the initiator.

Initiator operation may be validated through the nexus of the target and initiator 340. As described with respect to FIG. 2, embedded within the protocol of SCSI, SAS and Fibre Channel lies a handshaking communication protocol between a target and initiator. By verifying that the initiator has responded correctly to the target's behavior after execution of the command request including the vendor unique command relating to a selected characteristic for testing, the initiator's operation may be validated. It is contemplated that the target's behavior may also be validated by its response to the initiator's response to the target's operation. Further, while the use of vendor unique commands has been disclosed for control of a target's behavior, it is contemplated that other methods of control may be implemented without departing from the scope and intent of the present invention.

An advantageous aspect of the process 300 for validating initiator operation may be the reduction of cost and components necessary to support the testing. Lab costs may be minimized by reducing the amount of external hardware that conventional testing has required. Additionally, testing may be completed in the production environment without the use of separate devices for test setup. Precise timing control of protocol events may also be maintained to enhance testing and ensure proper validation of target and initiator operation.

Figure 4:
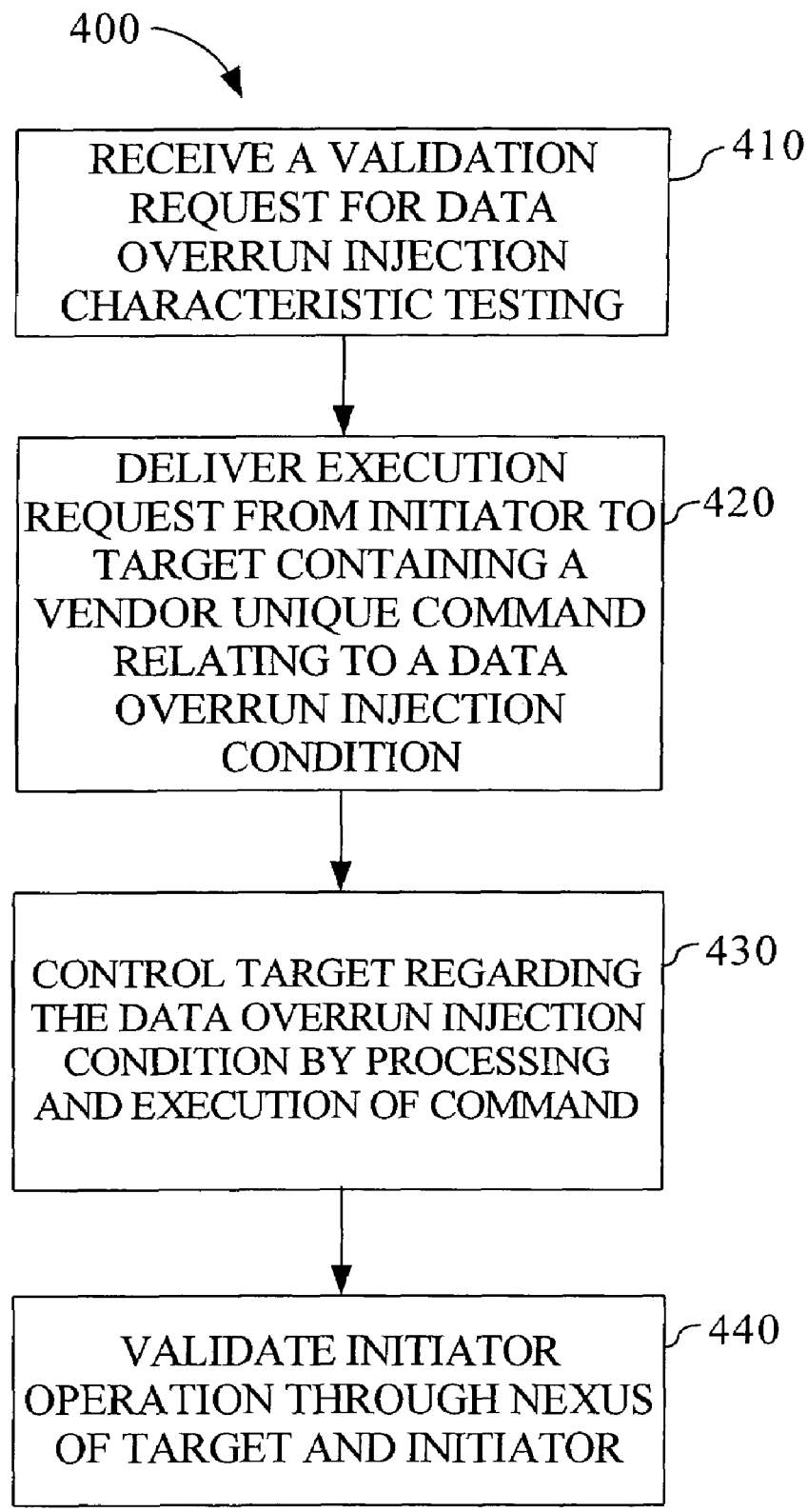
FIG. 4 depicts exemplary steps of a test performed in accordance with the process of FIG. 3 of the present invention.

Referring to FIG. 4, the steps of exemplary test 400 performed in accordance with the process of FIG. 3 of the present invention is shown. Test 400 may begin upon receipt of a validation request for data overrun injection 410. Data overrun injection may be one example of a characteristic for testing for proper initiator operation. A command from an initiator to a target containing a vendor unique command relating to data overrun injection may be delivered to a target 420. The behavior of the target regarding a data overrun injection condition is controlled by the initiator through by execution of the command 430. Initiator operation is validated though verification of the initiator's response to the target's operation according to the data overrun injection condition 440.

In an advantageous aspect of the present invention, a full test domain may be validated on an initiator. For example, the following target behaviors may be controlled: XFER-READY data request size, disconnect boundaries, failure status packets, data overrun injection, data underrun injection, CRC error injection, protocol violations, varying simulated spin up times and scatter gather list variation for data. It should be understood by those with ordinary skill in the art that other behaviors may be controlled by the initiator without departing from the scope and intent of the present invention.

It is contemplated that processes 200 and 300 of FIGS. 2-3 may be implemented within a program of instructions readable by a processing unit of a controller, computer, computer platform and the like. Additionally, processes 200 and 300 of FIGS. 2-3 may be implemented within bus architecture of 100 of FIG. 1. In an embodiment of the invention, vendor unique commands relating to characteristics for testing may be stored in command code 100 of bus architecture 100 of FIG. 1.

While embodiments of the invention have included the test communication handshake between the target and initiator to in-band commands, it is contemplated that out of band communication may be utilized to verify behavior on the bus during testing. Out of band communication may refer to non SCSI, non FC or non SAS communication for verifying behavior. For example, a serial port, network, separate Fibre Channel or separate SAS link may be utilized to provide the handshaking communicative capability. Additionally, with respect to the use of Fibre Channel, vendor unique link service frames may be employed in lieu of vendor unique commands.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for verifying operation of an initiator in bus architecture, comprising:
   receiving a selected characteristic for testing;
   controlling a behavior of a target according to said selected characteristic; and
   validating operation of an initiator, whereby a response of said initiator to said behavior of said target is monitored to ensure proper initiator operation, wherein said selected characteristic for testing is at least one of XFER-READY data request size, disconnect boundaries, failure status packets, data overrun injection, data underrun injection, CRC error injection, protocol violations, varying simulated spin up times and scatter gather list variation for data, wherein said receiving of said selected characteristic for testing is part of a full domain testing scheme whereby a receipt of said selected characteristic is a single test of said full domain testing scheme.

2. The method as claimed in claim 1, wherein controlling said behavior of said target includes delivering an executing request to said target, said execution request including a vendor unique command.

3. The method as claimed in claim 2, wherein said vendor unique command relates to said selected characteristic for testing.

4. The method as claimed in claim 3, wherein said behavior of said target is controlled by the execution of the execution request by said target.

5. The method as claimed in claim 1, further comprising validating operation of said target by monitoring a second response of said target to said response of said initiator.

6. A system for verifying operation of an initiator in a bus architecture, comprising:
   means for receiving a selected characteristic for testing;
   means for controlling a behavior of a target according to said selected characteristic; and
   means for validating operation of an initiator, whereby a response of said initiator
to said behavior of said target is monitored to ensure proper initiator operation,
   wherein said selected characteristic for testing is at least one of XFER-READY data request size, disconnect boundaries, failure status packets, data overrun injection, data underrun injection, CRC error injection, protocol violations, varying simulated spin up times and scatter gather list variation for data, wherein said selected characteristic for testing is part of a full domain testing scheme whereby a receipt of said selected characteristic is a single test of said full domain testing scheme.

7. The system as claimed in claim 6, wherein said means for controlling said behavior of said target includes means for delivering an executing request to said target, said execution request including a vendor unique command.

8. The system as claimed in claim 7, wherein said vendor unique command relates to said selected characteristic for testing.

9. The system as claimed in claim 6, further comprising means for validating operation of said target by monitoring a second response of said target to said response of said initiator.

10. The system as claimed in claim 6, wherein said bus architecture operates according to at least one of the following protocols: SCSI, SAS and Fibre Channel.

11. A method for verifying operation of an initiator in a bus architecture, comprising:
    receiving a selected characteristic for testing;
    delivering an execution request to said target, said execution request including a
    vendor unique command;
    executing of said execution request by said target; and
    validating operation of an initiator, whereby a response of said initiator to a
    behavior exhibited by said target is monitored to ensure proper initiator operation,
    wherein said desired characteristic for testing is at least one of XFER-READY data request size, disconnect boundaries, failure status packets, data overrun injection, data underrun injection, CRC error injection, protocol violations, varying simulated spin up times and scatter gather list variation for data, wherein said receiving of said selected characteristic for testing is part of a full domain testing scheme whereby a receipt of said selected characteristic is a single test of said full domain testing scheme.

12. The method as claimed in claim 11, wherein said behavior of said target is controlled by the execution of the execution request by said target.

13. The method as aimed in claim 11, further comprising validating operation of said target by monitoring a second response of said target to said response of said initiator.

14. The method as claimed in claim 11, wherein said bus architecture operates according to at least one of the following protocols: SCSI, SAS and Fibre Channel.

* * * * *